(12) United States Patent
Salah et al.

(10) Patent No.: US 11,813,802 B2
(45) Date of Patent: *Nov. 14, 2023

(54) METHODS OF JOINING AND REPAIRING COMPOSITE COMPONENTS

(71) Applicant: Rohr, Inc., Chula Vista, CA (US)

(72) Inventors: Lamia Salah, San Diego, CA (US); Noushin Bahramshahi, San Diego, CA (US); Daniel O. Ursenbach, Caledonia, IL (US)

(73) Assignee: ROHR, INC., Chula Vista, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/397,435

(22) Filed: Aug. 9, 2021

(65) Prior Publication Data
US 2021/0362437 A1 Nov. 25, 2021

Related U.S. Application Data

(63) Continuation of application No. 16/378,086, filed on Apr. 8, 2019, now Pat. No. 11,084,228.

(51) Int. Cl.
*B29C 65/18* (2006.01)
*B29C 65/00* (2006.01)
(Continued)

(52) U.S. Cl.
CPC .......... *B29C 65/18* (2013.01); *B29C 66/1162* (2013.01); *B29C 66/12822* (2013.01);
(Continued)

(58) Field of Classification Search
CPC ......... B29C 65/00; B29C 65/02; B29C 65/18; B29C 65/78; B29C 65/7802; B29C 65/7805; B29C 65/7814; B29C 65/7841; B29C 66/00; B29C 66/01; B29C 66/05; B29C 66/301; B29C 66/40; B29C 66/41; B29C 66/43; B29C 66/435; B29C 66/47; B29C 66/472; B29C 66/4722;
(Continued)

(56) References Cited

U.S. PATENT DOCUMENTS 5,078,821 A 1/1992 Garvey
5,362,347 A 11/1994 Domine
(Continued)

FOREIGN PATENT DOCUMENTS

DE 3913723 A1 * 10/1990 ............ B29C 66/43
DE 3923785 A1 1/1991
(Continued)

*Primary Examiner* — Philip C Tucker
*Assistant Examiner* — Brian R Slawski
(74) *Attorney, Agent, or Firm* — GETZ BALICH LLC

(57) ABSTRACT

A first thermoplastic component and a second thermoplastic component including a first joint portion and a second joint portion, respectively, are provided. A least a portion of a surface area of each of the first and second joint portions include a respective first and second mating surface. The first and second mating surfaces of the respective first and second joint portions are positioned in contact with one another. The first and second joint portions are fusion joined. Fusion joining the first and second joint portions forms a fused unitary portion of the first and second thermoplastic components.

20 Claims, 12 Drawing Sheets

(51) Int. Cl.
*B64F 5/10* (2017.01)
*B32B 27/08* (2006.01)
*B32B 37/04* (2006.01)
*B29C 73/10* (2006.01)

(52) U.S. Cl.
CPC ........ *B29C 66/12861* (2013.01); *B29C 66/71* (2013.01); *B29C 66/72141* (2013.01); *B29C 66/81425* (2013.01); *B29C 66/83221* (2013.01); *B29C 66/1122* (2013.01); *B29C 66/301* (2013.01); *B29C 66/435* (2013.01); *B29C 66/4722* (2013.01); *B29C 73/10* (2013.01); *B32B 27/08* (2013.01); *B32B 37/04* (2013.01); *B32B 2398/20* (2013.01); *B32B 2605/18* (2013.01); *B64F 5/10* (2017.01)

(58) Field of Classification Search
CPC ....... B29C 66/474; B29C 66/70; B29C 66/71; B29C 66/72; B29C 66/721; B29C 66/83221; B29C 73/00; B29C 73/10; B29C 73/12; B29C 66/1122; B29C 66/1162; B29C 66/12822; B29C 66/12861; B29C 66/72141; B29C 66/81425; B29C 66/8242; B29C 66/929; B29C 66/919; B29C 66/5326; B29C 66/532; B29C 66/8432; B29C 66/524; B29C 66/81431; B29C 66/81427; B29C 66/81422; B29C 66/81423; B29C 66/1286; B29C 66/12842; B29C 66/14; B29C 66/12841; B29C 66/72143; B29C 66/54; B29C 66/73921; B29C 73/30; B29C 2073/262; B29C 2073/264; B32B 27/08; B32B 2398/20; B32B 2605/18; B32B 37/04; B32B 37/06; B32B 37/065; B32B 2262/10; B32B 2262/101; B32B 2262/106; B64F 5/10; B64F 5/40; B64C 1/00; B29L 2031/3082
USPC ............ 156/60, 94, 98, 196, 218, 228, 242, 156/244.11, 304.1, 304.2, 304.5, 304.6, 156/308.2, 309.6, 349, 580, 581, 583.1; 264/258, 263; 428/98, 174, 192; 100/35, 100/38
See application file for complete search history.

(56) References Cited

U.S. PATENT DOCUMENTS

| | | | |
|---|---|---|---|
| 5,376,220 | A | 12/1994 | Campbell |
| 5,462,408 | A | 10/1995 | Coffy |
| 8,603,279 | B2 | 12/2013 | Malasse |
| 9,358,764 | B2 | 6/2016 | Prebil |
| 2011/0174426 | A1 | 7/2011 | Weimer |
| 2013/0092309 | A1* | 4/2013 | Malasse ............ B29C 66/92443 156/60 |
| 2013/0327588 | A1 | 12/2013 | Christenson |
| 2014/0087143 | A1 | 3/2014 | Pacchione |
| 2014/0352877 | A1 | 12/2014 | Fernandez Alonso |
| 2015/0114550 | A1 | 4/2015 | Kurtz |
| 2016/0089836 | A1 | 3/2016 | Shaw |
| 2016/0176102 | A1 | 6/2016 | Silvanus |
| 2017/0043526 | A1 | 2/2017 | Ohki |
| 2017/0100901 | A1 | 4/2017 | Del Pinto |
| 2017/0313002 | A1 | 11/2017 | Huang |
| 2018/0133681 | A1 | 5/2018 | Linde |
| 2018/0264756 | A1 | 9/2018 | Giaraffa |

FOREIGN PATENT DOCUMENTS

| | | |
|---|---|---|
| DE | 3913723 C2 | 5/1991 |
| DE | 4033646 C2 | 6/1995 |
| DE | 102016210086 A1 | 12/2017 |

\* cited by examiner

METHODS OF JOINING AND REPAIRING COMPOSITE COMPONENTS

This application is a continuation of U.S. patent application Ser. No. 16/378,086 filed Apr. 8, 2019, now U.S. Pat. No. 11,084,228, which is hereby incorporated herein by reference in its entirety.

BACKGROUND

1. Technical Field

This disclosure relates generally to methods for joining and repairing components, and more particularly to methods for joining and repairing thermoplastic composite components.

2. Background Information

Components made from thermoplastic composite materials are increasingly in demand in the aircraft and other industries as a result of the wide-ranging advantages of the materials. Thermoplastic composite materials can be used to form lightweight and high-strength structures having complex shapes. In addition, thermoplastic composites, as compared to thermosets, offer practically infinite shelf life, faster cycle time, the ability to be recycled/reformed, improved damage tolerance properties, as well as moisture and chemical resistance.

However, widespread adoption of thermoplastic composites in some industries, such as the aircraft industry, has been limited as a result of challenges with thermoplastic components manufacturing and repair. Current methods of joining thermoplastic components may use adhesives or thermoplastic films to join two or more components, thereby forming joints between the two or more components which may exhibit reduced structural strength. Accordingly, improved methods for manufacturing and repairing thermoplastic components which meet industry, safety, airworthiness, and fast throughput requirements are desirable to support industry's increased production rates.

SUMMARY

According to an embodiment of the present disclosure, a method for joining thermoplastic components is provided. A first thermoplastic component and a second thermoplastic component including a first joint portion and a second joint portion, respectively, are provided. A least a portion of a surface area of each of the first and second joint portions include a respective first and second mating surface. The first and second mating surfaces of the respective first and second joint portions are positioned in contact with one another. The first and second joint portions are fusion-joined resulting in a single component. Fusion-joining the first and second joint portions forms a fused unitary portion of the first and second thermoplastic components.

In the alternative or additionally thereto, in the foregoing embodiment, the unitary portion is a homogenous portion.

In the alternative or additionally thereto, in the foregoing embodiment, the first and second mating surfaces have a load bearing joint configuration such as a scarf joint, a step joint or any other suitable joint for the particular application.

In the alternative or additionally thereto, in the foregoing embodiment, the step of fusion-joining the first and second substrates includes applying a heat and a pressure to the first and second joint portions simultaneously.

In the alternative or additionally thereto, in the foregoing embodiment, the method further includes consolidating the first and second joint portions with a press system.

In the alternative or additionally thereto, in the foregoing embodiment, the press system forms a first interface with a first surface of at least one of the first and second joint portions and a second interface with a second surface of at least one of the first and second joint portions opposite the first and second joint portions from the first interface and the first and second surfaces are different than the first and second mating surfaces.

In the alternative or additionally thereto, in the foregoing embodiment, all of the second thermoplastic component is the second joint portion.

In the alternative or additionally thereto, in the foregoing embodiment, the heat applied to the first and second joint portions is in the range of 600 to 800° F.

In the alternative or additionally thereto, in the foregoing embodiment, the first and second joint portions include a volume of the respective first and second thermoplastic composite components.

In the alternative or additionally thereto, in the foregoing embodiment, a thickness of the first and second joint portions disposed between the first and second interfaces is greater or equal to 0.020 inches.

In the alternative or additionally thereto, in the foregoing embodiment, a first material of the first component and a second material of the second component each include at least one ply having a plurality of reinforcing fibers.

In the alternative or additionally thereto, in the foregoing embodiment, the plurality of reinforcing fibers in the at least one ply has a unidirectional fiber orientation.

According to another embodiment of the present disclosure, a method for joining thermoplastic components is provided. A first thermoplastic component and a second thermoplastic component including a first joint portion and a second joint portion, respectively, are provided. The first and second joint portions include a volume of the respective first and second thermoplastic components. At least a portion of a surface area of each of the first and second joint portions includes a respective first and second mating surface. The first and second mating surfaces of the respective first and second joint portions are positioned in contact with one another. The first and second joint portions are consolidated with a press system. The first and second joint portions are fusion-joined thereby forming a single component. Fusion-joining the first and second joint portions forms a unitary portion of the first and second thermoplastic components which is a homogenous portion In the alternative or additionally thereto, in the foregoing embodiment, the first and second mating surfaces have a load bearing joint configuration.

In the alternative or additionally thereto, in the foregoing embodiment, the press system forms a first interface with a first surface of at least one of the first and second joint portions and a second interface with a second surface of at least one of the first and second joint portions opposite the first and second joint portions from the first interface and the first and second surfaces are different than the first and second mating surfaces.

In the alternative or additionally thereto, in the foregoing embodiment, a first material of the first component and a second material of the second component each include at least one ply having a plurality of reinforcing fibers.

In the alternative or additionally thereto, in the foregoing embodiment, the plurality of reinforcing fibers in the at least one ply has a unidirectional fiber orientation.

In the alternative or additionally thereto, in the foregoing embodiment, the step of fusion-forming the first and second joint portions includes applying a heat and a pressure to the first and second joint portions simultaneously and the heat applied to the first and second joint portions is in the range of 600° F. to 800° F.

According to another embodiment of the present disclosure, a method for repairing a thermoplastic component is provided. A first mating surface of the thermoplastic component is positioned against a second mating surface of a thermoplastic patch. The thermoplastic component has a first side and an opposing second side. The first mating surface of the thermoplastic component is disposed on the first side. The thermoplastic patch and the thermoplastic component are consolidated with a press system. The press system forms a first interface with at least one of the thermoplastic patch and the first side of the thermoplastic component and a second interface with the second side of the thermoplastic component. The thermoplastic patch and the thermoplastic component are fusion-joined. Fusion-joining the thermoplastic patch and the thermoplastic component forms a fused unitary portion of the thermoplastic patch and the thermoplastic component which is a homogenous portion.

In the alternative or additionally thereto, in the foregoing embodiment, the method further includes forming a load bearing configuration on the first mating surface.

The present disclosure, and all its aspects, embodiments and advantages associated therewith will become more readily apparent in view of the detailed description provided below, including the accompanying drawings.

DETAILED DESCRIPTION

Figure 1:
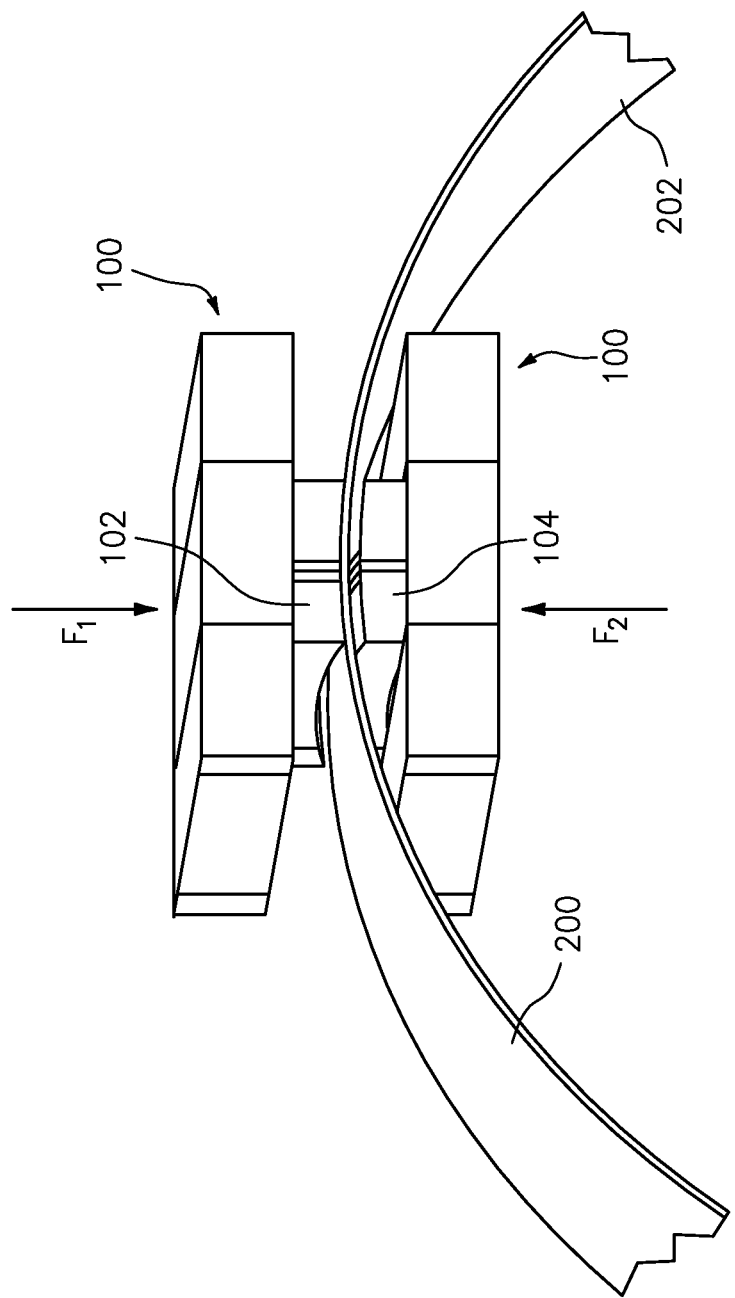
FIG. 1 illustrates a perspective view of components at a stage of a joining process.

It is noted that various connections are set forth between elements in the following description and in the drawings. It is noted that these joints are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIGS. 1, 1A-D, and 6, aspects of the present disclosure include an exemplary method 600 for joining two or more components, such as a first component 200 and a second component 202. Accordingly, the method 600 may provide for forming a unitary component 214 from the first and second components 200, 202 such that the unitary component 214 is a homogenous consolidated component identical to the parent substrates (i.e., the first and second components 200, 202). As shown in FIG. 1, the first and second components 200, 202 may be composite skin panels as may be used, for example, to form an exterior surface of an aircraft. However, the present disclosure should not be understood to be limited to joining or repairing aircraft components.

One or both of the first and second components 200, 202 may be made all or in part from a composite material, for example, a thermoplastic material. One or both of the first and second components 200, 202 may consist of one or more plies (i.e., layers) of composite material which have been stacked and joined to form the respective component 200, 202. In some embodiments, one or more of the plies may include a plurality of reinforcing fibers embedded therein. The plurality of fibers disposed within the composite plies may be continuous or discontinuous. The fibers may be parallel or substantially parallel to one another. As used herein, the fibers are substantially parallel if they extend along a common direction +/−10 degrees. The fibers may also have a multi-directional configuration, e.g., a woven fiber orientation. In some embodiments, one or both of the first and second components 200, 202 may include one or more plies having unidirectional fibers and one or more other plies having multidirectional fibers.

With reference to step 602 of the method 600, the first component 200 includes a first joint portion 204 including at least a portion of the volume of the first component 200 (i.e., a three-dimensional portion of the first component 200). A first mating surface 208 forms at least a portion of the surface area of the first joint portion 204. Similarly, the second component 202 includes a second joint portion 206 including at least a portion of the volume of the first component 200 (i.e., a three-dimensional portion of the second component 202). A second mating surface 210 forms at least a portion of the surface area of the second joint portion 206. The first and second joint portions 204, 206, as shown in the figures, are provided to better convey the aspects of the present disclosure, however, it should be understood that joint portions, such as the first and second joint portions 204, 206, may have a different size, shape, or orientation than what is illustrated in the figures provided.

Figure 1A:
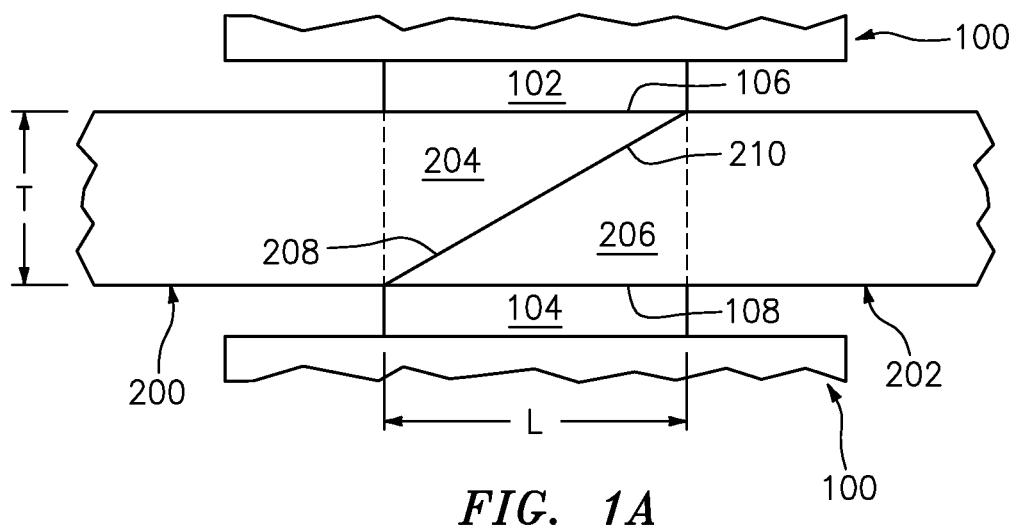
FIG. 1A illustrates a side cross-sectional view of the components of FIG. 1 at a stage of a joining process.

As best shown in FIG. 1A, the first mating surface 208 of the first joint portion 204 is positioned in contact with the second mating surface 210 of the second joint portion 206 (step 604). The first and second components 200, 202 are positioned with respect to one another such that following the joining process the resultant unitary component 214 (see, e.g., FIG. 1B) will have the desired orientation. Auxiliary fixturing (not shown), for example, mechanical support structures, may be required to provide additional support to distal portions of one or both of the first and second components 200, 202 with respect to the first and second joint portions 204, 206 in order to provide sufficient stability and prevent undesirable movement between the first and second joint portions 204, 206 during the joining process.

The first and second mating surfaces 208, 210 may have a load bearing joint configuration to improve the structural integrity of the unitary component 214. For example, the first and second mating surfaces 208, 210 may have corresponding load bearing joint configurations which may include, for example, a scarf configuration (see FIGS. 1A-C), a step configuration (see FIG. 1D), or any other suitable load bearing joint configuration to meet the specific structural requirements of the unitary component 214.

Once the first and second mating surfaces 208, 210 are positioned in contact with one another, the first and second joint portions 204, 206 of the first and second components 200, 202 are consolidated with a press system 100 configured to apply heat and a pressure to the first and second joint portions 204, 206 (step 606), or any other suitable system for applying a heat and a pressure to the first and second joint portions 204, 206. The press system 100 may include press platens and/or one or more tooling portions, such as first and second tooling portions 102, 104, tailored specifically to the mating surface 208, 210 geometry of the first and second joint portions 204, 206 (e.g., the first and second tooling portions 102, 104 may be configured to conform to the surface geometry of the first and second mating surfaces 208, 210, respectively) (Step 603).

Figure 1B:
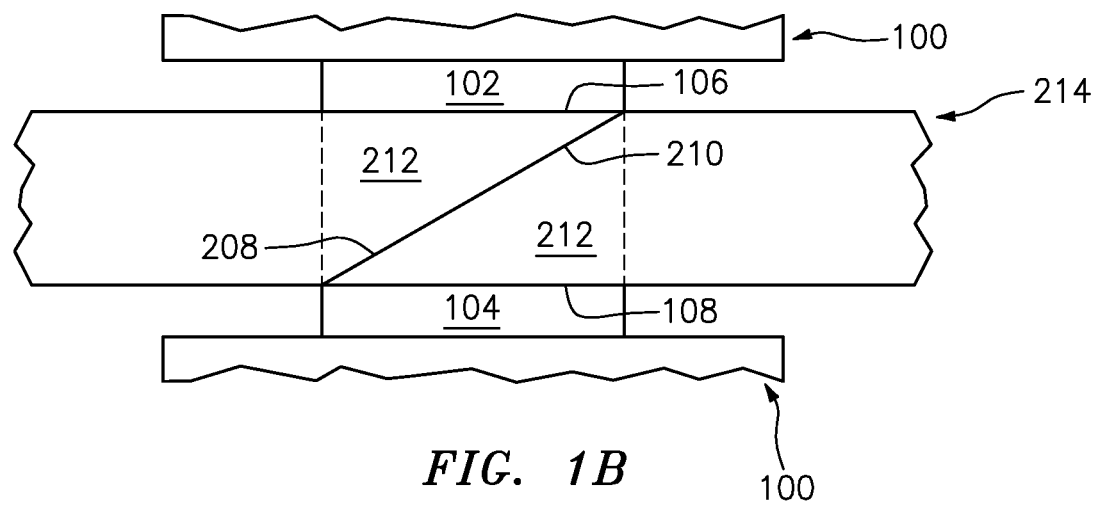
FIG. 1B illustrates a side cross-sectional view of the components of FIG. 1 at a stage of a joining process.
Figure 1C:
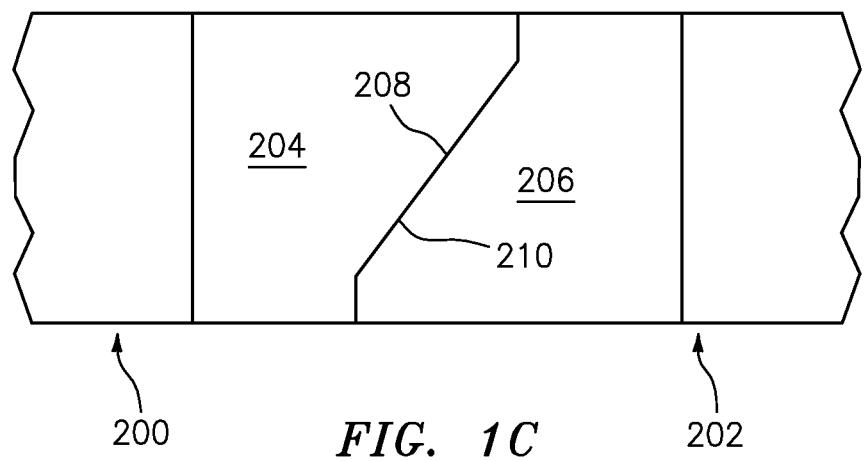
FIG. 1C illustrates a side cross-sectional view of an exemplary joint between the components of FIG. 1.
Figure 1D:
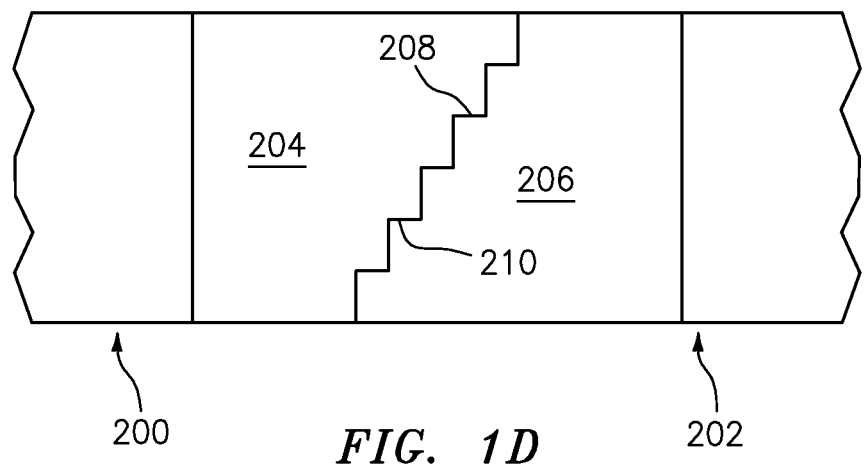
FIG. 1D illustrates a side cross-sectional view of an exemplary joint between the components of FIG. 1.

Consolidating the first and second joint portions 204, 206 includes positioning the first and second tooling portions 102, 104 in contact with the first and second components 200, 202 so as to form an interface with the first and second components 200, 202. For example, as shown in FIGS. 1A and 1B, the first tooling portion 102 may form a first interface 106 with the first and second components 200, 202 proximate the first and second joint portions 204, 206. The second tooling portion 104 may form a second interface 108 with the first and second components 200, 202 proximate the first and second joint portions 204, 206 opposite the first interface 106 with respect to the first and second components 200, 202. When consolidating the first and second joint portions 204, 206, the press system 100 may apply a pressure to one or both of the first and second components 200, 202 via the first and second tooling portions 102, 104.

The first and second interfaces 106, 108 may be formed between the first and second tooling portions 102, 104 and a surface of one or both of the first and second joint portions 204, 206 different than the respective first and second mating surfaces 208, 210. As shown in FIG. 1, the press system 100 may apply pressure to the first and second joint portions 204, 206 in a general direction of forces $F_1$, $F_2$ (i.e., the press system 100 applies force $F_1$ at the first interface 106 and force $F_2$ at the second interface 108). The press system 100 may be a hydraulic, pneumatic, or electromechanical assembly or any other suitable assembly for providing adequate pressure to the above-described components, such as the first and second components 200, 202.

As discussed above, in some embodiments, one or both of the first and second tooling portions 102, 104 may be tailored to the specific geometry of the first and second components 200, 202 at the respective first and second interfaces 106, 108. As shown in FIG. 1A, a length L of one or both of the first and second interfaces 106, 108 may substantially correspond to a combined length of the first and second joint portions 204, 206. However, the length L of one or both of the first and second interfaces 106, 108 may be longer or shorter than the corresponding length of the first and second joint portions 204, 206, individually or in combination.

As shown in FIG. 1A, the first and second joint portions 204, 206 have a thickness T disposed between the first and second interfaces 106, 108. In some embodiments, the thickness T of the first and second joint portions 204, 206 may be substantially the same. However, in other embodiments, the thickness T of one of the first and second joint portions 204, 206 may be greater or less than the thickness T of the other of the first and second joint portions 204, 206. In some embodiments, the thickness T may be in the range of 0.020 to 1.500 inches. In some other embodiments, the thickness T may exceed 1.5 inches.

The first and second joint portions 204, 206 of the respective first and second components 200, 202 are fusion-joined by applying a heat and a pressure to the first and second joint portions 204, 206 for a sufficient amount of time to form a fused unitary portion 212 (step 608, see FIG. 1B). For example, the volume of the first and second joint portions 204, 206 may be melted while applying heat and pressure with the press system 100. In some embodiments, the heat applied to the first and second joint portions 204, 206 by the press system 100 may be in the range of 700 to 800° F. Additionally, in some embodiments, the pressure applied by the press system 100 to the first and second tooling portions 102, 104 may be up to 1000 psi. In some other embodiments, the pressure applied by the press system 100 to the first and second tooling portions 102, 104 may be up to 2500 psi. In still some other embodiments, the pressure applied by the press system 100 to the first and second tooling portions 102, 104 may be greater than 2500 psi. The pressure required to be applied to the tooling portions 102, 104 may depend on a number of factors, for example, the size and complexity of the tooling portion geometry. It should be understood that the resulting pressure applied to the first and second joint portions 204, 206 may be different than the pressure applied to the first and second tooling portions 102, 104.

Fusion-joining of the first and second joint portions 204, 206 forms the unitary portion 212 which is a homogenous portion with respect to the material of the first and second components 200, 202 (i.e., no additional material is introduced, e.g., adhesives, welding strips, composite fillers, films, or coatings, etc.). The unitary joint portion 212 may have a fiber orientation which is substantially similar to the fiber orientation of one or both of the first and second components 200, 202. Accordingly, through the fusion-joining process, the first and second joint portions 204, 206 are formed into the unitary portion 212 thereby forming the unitary component 214 from the first and second components 200, 202. Subsequent to fusion-joining the first and second joint portions 204, 206, the unitary portion 212 may be cooled to allow the unitary portion 212 to solidify and/or demold (Step 610).

Figure 2:
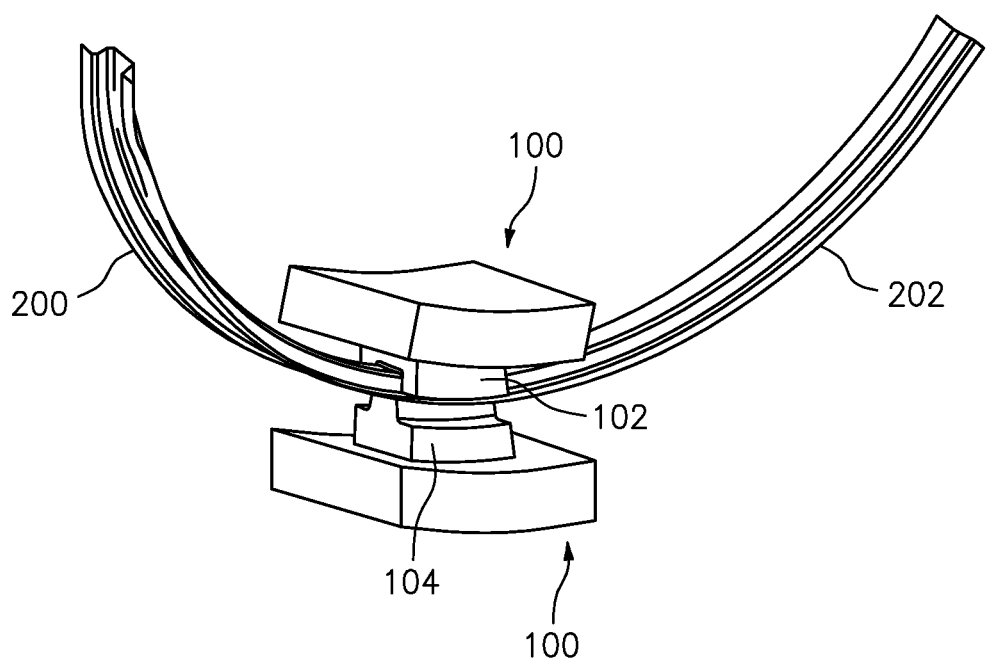
FIG. 2 illustrates a perspective view of components at a stage of a joining operation.
Figure 3:
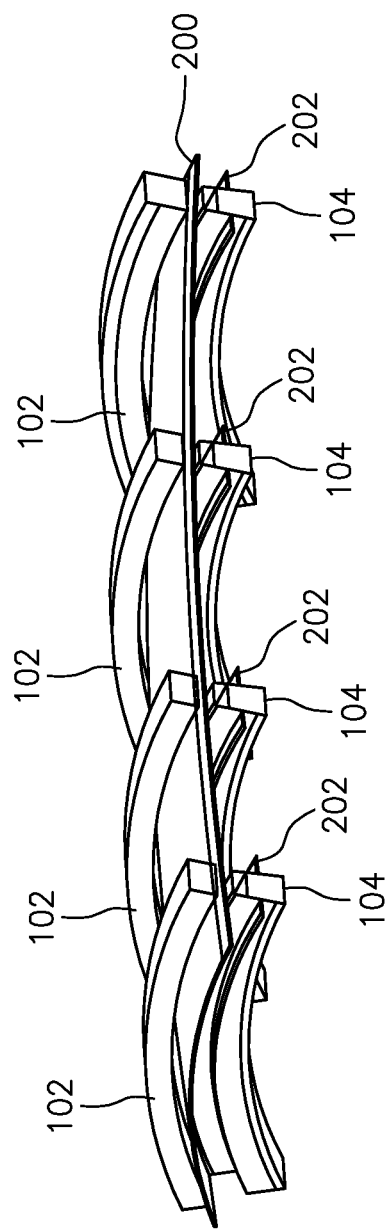
FIG. 3 illustrates a perspective view of components at a stage of a joining operation.
Figure 4:
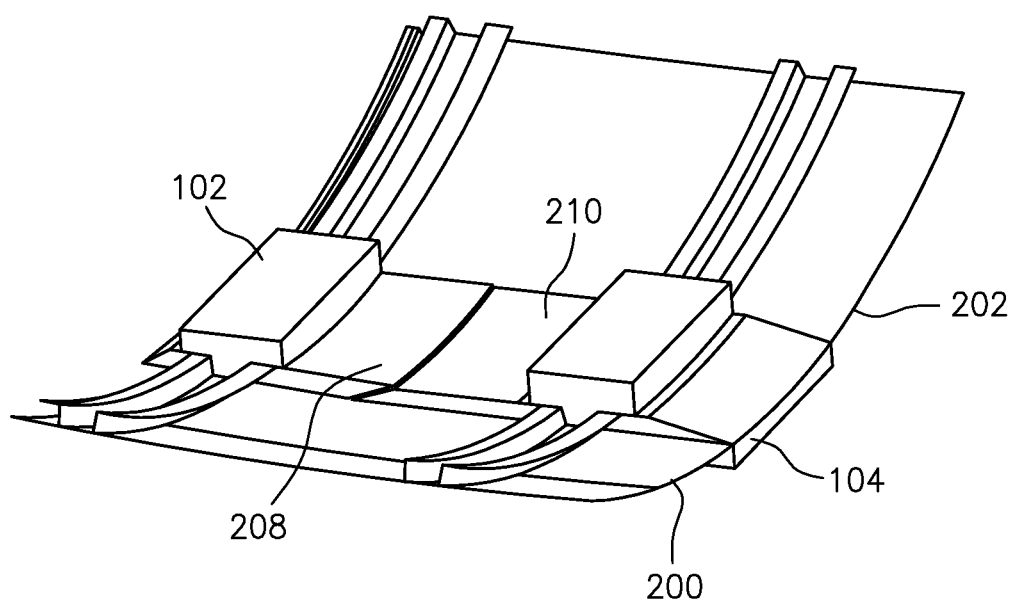
FIG. 4 illustrates a perspective view of components at a stage of a joining operation.

Referring now to FIGS. 2-4, aspects of the present disclosure are illustrated with components which are different than the first and second components 200, 202 illustrated in FIG. 1. As previously discussed, the method 600 for joining components may be applied to any suitable components. For example, FIG. 2 shows the first and second components 200, 202 which are exemplary stiffeners disposed between the first and second tooling portions 102, 104 of the press system 100 during a stage of the method 600. FIG. 3 shows the first and second components 200, 202 during a stage of the method 600 wherein the first component 200 is a skin panel, similar to the skin panels of FIG. 1 (before or after the discussed joining process), and the second component 202 is a plurality of stiffeners, similar to the stiffeners of FIG. 2 (before or after the discussed joining process). Finally, FIG. 4 shows the first and second components 200, 202 during a stage of the method 600 wherein the first and second components 200, 202 are skin-stiffened assemblies, for example, the skin-stiffened assembly shown in FIG. 3 at a stage of the method 600.

Figure 3A:
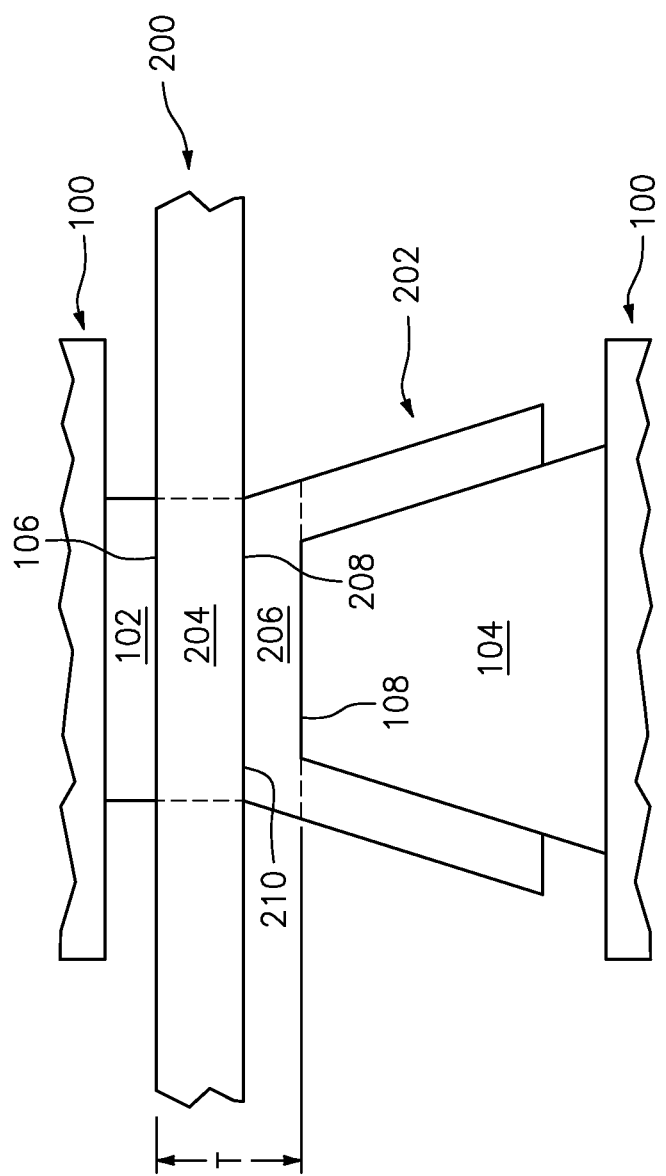
FIG. 3A illustrates a side cross-sectional view of the components of FIG. 3 at a stage of a joining operation.

As previously discussed, the first and second joint portions 204, 206 have a thickness T disposed between the first and second interfaces 106, 108. As shown in FIG. 3A, the thickness T between the first and second interfaces 106, 108 of the respective first and second tooling portions may be a combined thickness of the first and second joint portions 204, 206.

Figure 5:
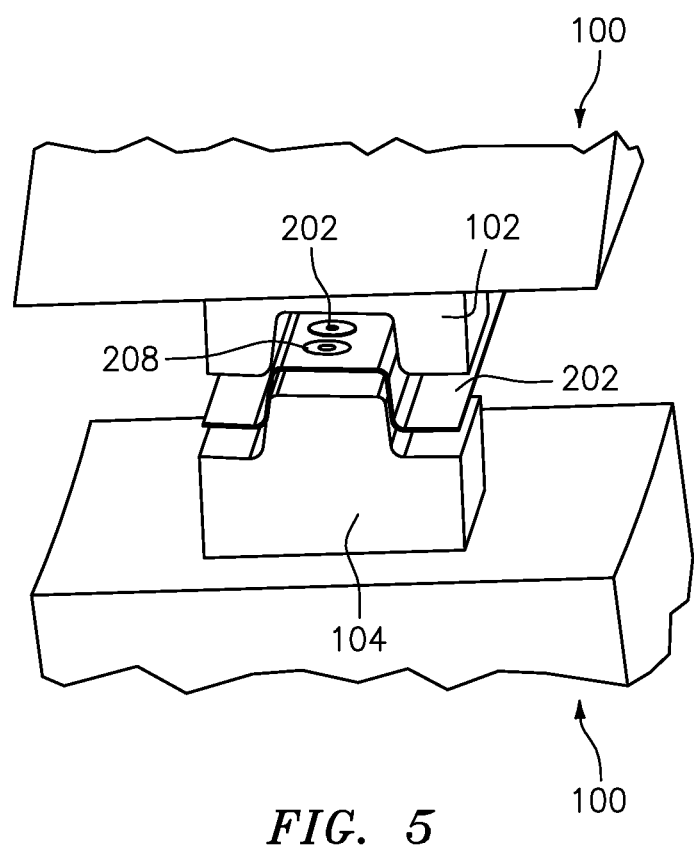
FIG. 5 illustrates a perspective view of components at a stage of a joining operation.
Figure 5A:
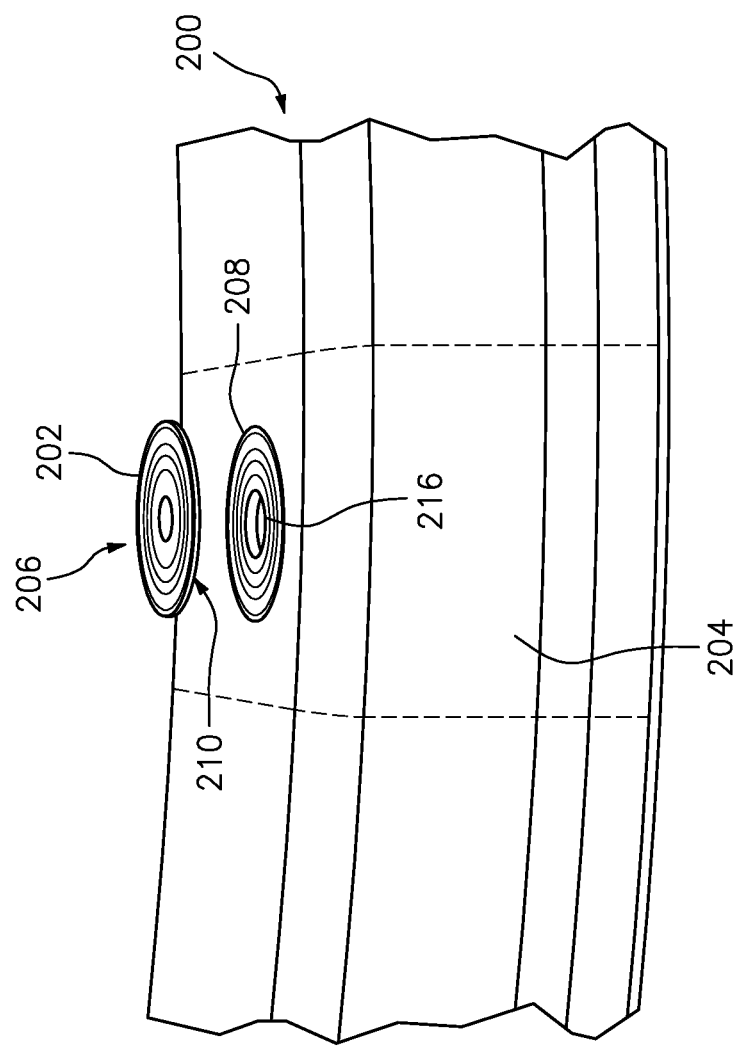
FIG. 5A illustrates another view of the components of FIG. 5.
Figure 5B:
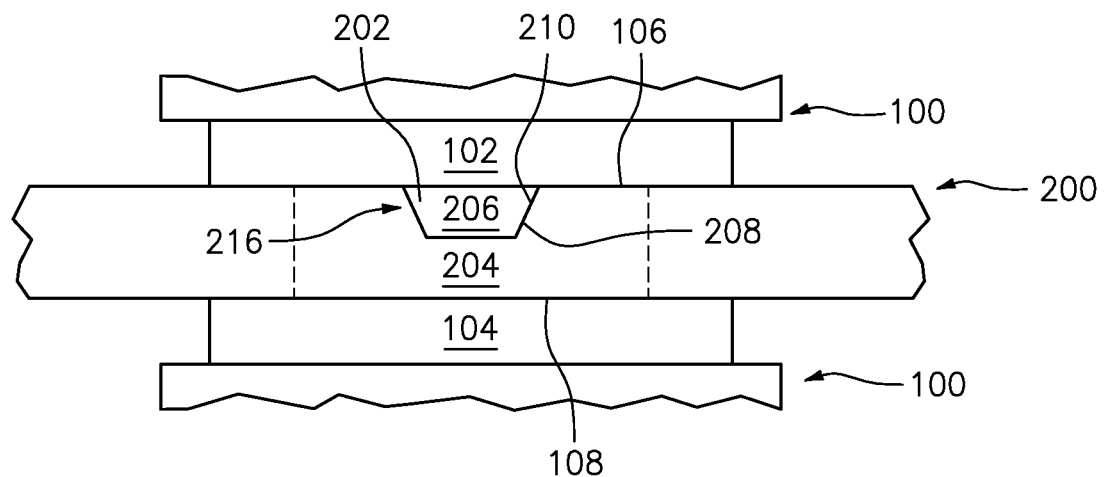
FIG. 5B illustrates a side cross-sectional view of the components of FIG. 5 at a stage of the repairing process.
Figure 5C:
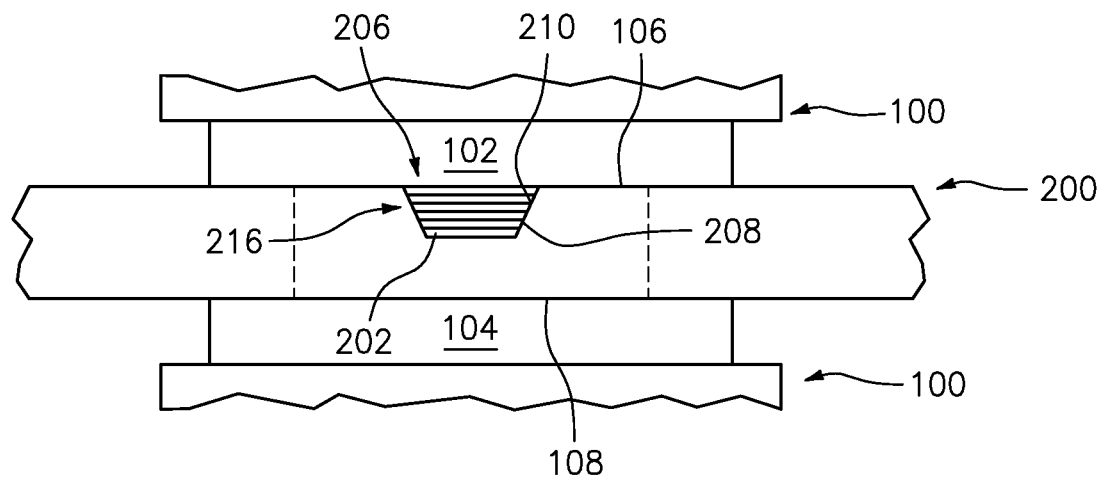
FIG. 5C illustrates a side-cross-sectional view of the components of FIG. 5 at a stage of the repairing process.
Figure 6:
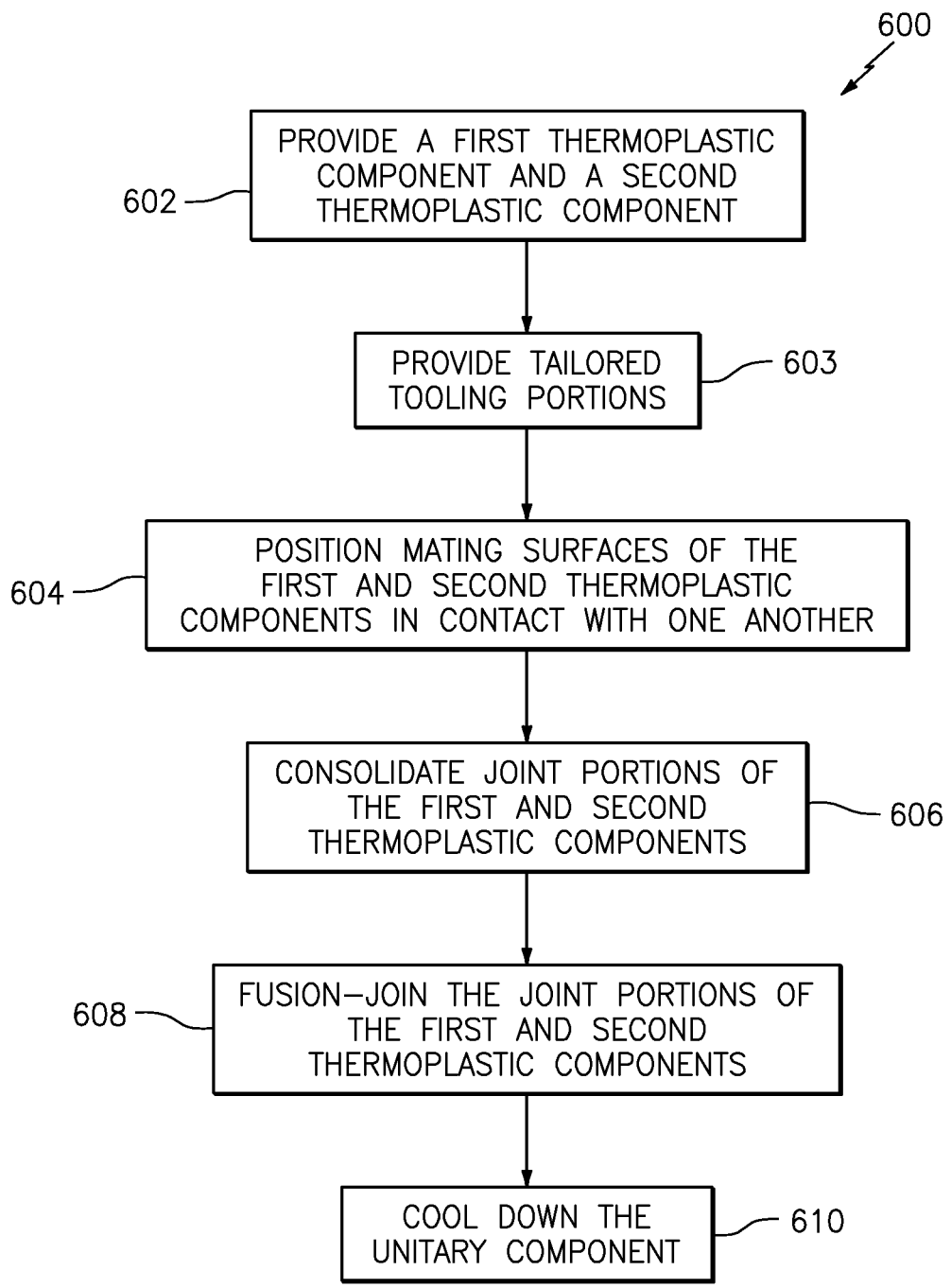
FIG. 6 illustrates a flowchart for a method of joining components.
Figure 7:
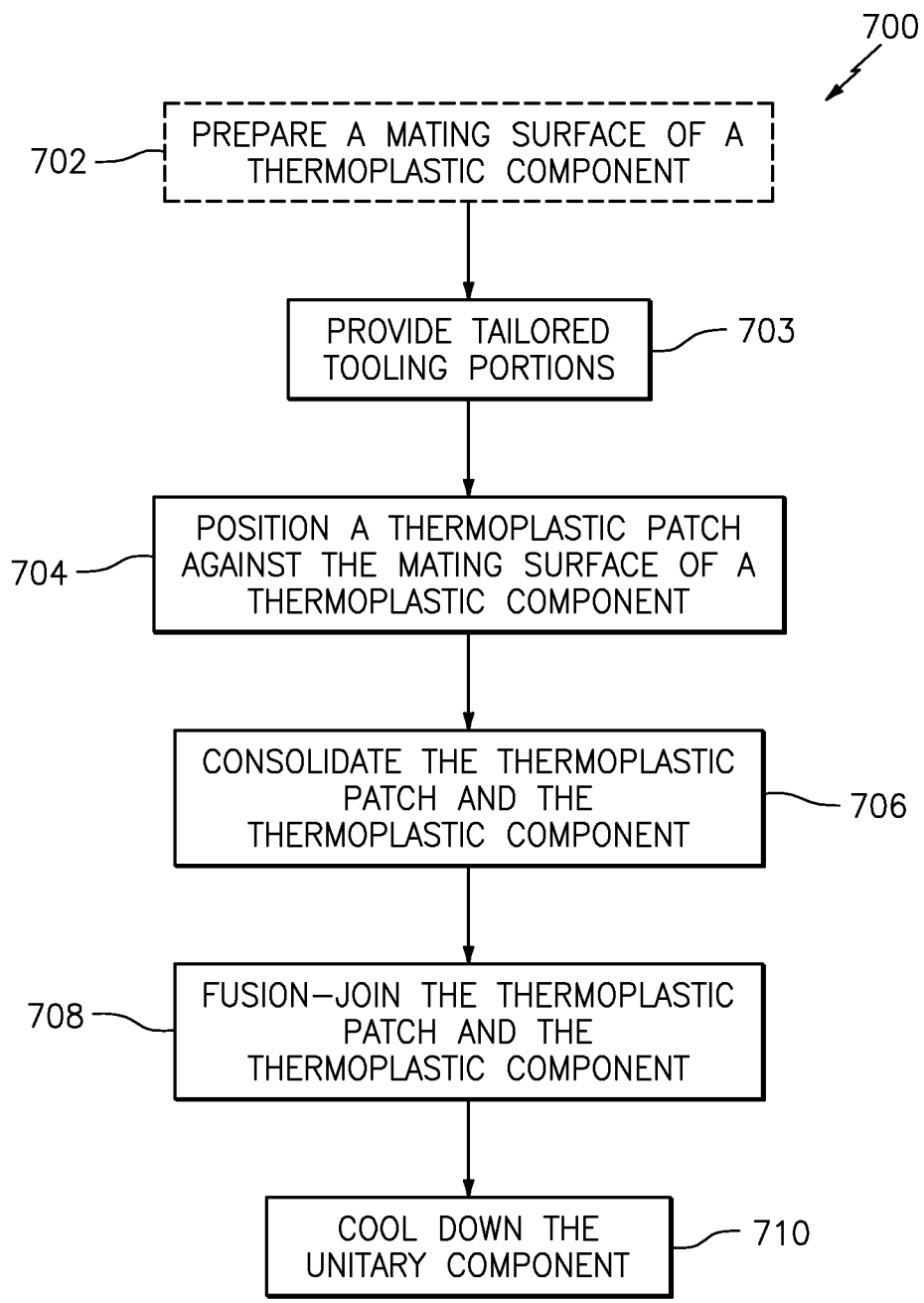
FIG. 7 illustrates a flowchart for a method of repairing a component.

Referring to FIGS. 5, 5A-C, and 7, aspects of the present disclosure include an exemplary method 700 for repairing a component, for example, the first component 200. Accordingly, aspects of the present disclosure may be used to repair damage or a defect, such as damage/defect 216, present in the first component 200. A defect can be cosmetic, such as a crack, groove, or pit and may result from process deviations during manufacturing such as voids, porosity, polymer rich or starved areas, etc. Damage can be structural, such as a small crack or a large crack which spans two surfaces of the first component 200, porosity, a delamination resulting from an impact or a tool drop, etc. A structural defect may be a defect which facilitates crack propagation or other failure mechanisms. A cosmetic defect may detract from aesthetics of the exposed surfaces of the first component 200. In some embodiments, repairing the first component 200 may require a second component 202 configured as, for example, a patch formed from previously joined plies of thermoplastic material (see, e.g., FIGS. 5 and 5A-B). In other embodiments, the second component (i.e., the patch) may be formed as a ply-by-ply layup tailored to the damage/defect 216 and the first mating surface 208 of the first joint portion 204 (see, e.g., FIG. 5C). For example, individual plies may be cut to the desired contour and laid up in the scarfed area as shown in FIG. 5C. However, repairing the first component 200 according to aspects of the present disclosure may be performed, in some circumstances (e.g., repairing a crack) without requiring the additional material of the second component 202.

Optionally, one or both of the first and second mating surfaces 208, 210 of the respective first and second components 200, 202, may be prepared for fusion-joining by processing the mating surface 208, 210 to remove damaged material (e.g., by sanding, cutting, etc.), apply a load bearing configuration such as the scarf configuration (see, e.g., FIG. 5A), apply a surface texture configuration, or other suitable configuration to the mating surface 208, 210 (step 702). For example, the mating surface 208, 210 processing may be performed proximate or surrounding the defect 216 on a surface of the first component 200.

The first mating surface 208 of the first joint portion 204 is positioned in contact with the second mating surface 210 of the second joint portion 206 (step 704). As shown in FIG. 5A, in some embodiments, the second joint portion 206 may include all or substantially all of the volume of the second component 202. The first and second components 200, 202 are positioned with respect to one another such that following the repairing process the unitary component 214 will have the desired orientation.

Once the first and second mating surfaces 208, 210 are positioned in contact with one another, the first and second joint portions 204, 206 of the first and second components 200, 202 are consolidated with a press system 100 (step 706). As described above, the press system 100 may include one or more tooling portions, such as first and second tooling portions 102, 104, configured to form an interface with the first and second components 200, 202. For example, as shown in FIGS. 5B and 5C, the first tooling portion 102 may form a first interface 106 with the first and second components 200, 202 proximate the first and second joint portions 204, 206. The second tooling portion 104 may form a second interface 108 with the first and second components 200, 202 proximate the first and second joint portions 204, 206 opposite the first interface 106 with respect to the first and second components 200, 202. The first and second interfaces 106, 108 may be formed between the first and second tooling portions 102, 104 and a surface of one or both of the first and second joint portions 204, 206 different than the respective first and second mating surfaces 208 210. Similar to Step 603, first and second tooling portions 102, 104 tailored specifically to the mating surface 208, 210 geometry of the first and second joint portions 204, 206 may be provided (Step 703).

The first and second joint portions 204, 206 of the respective first and second components 200, 202 are fusion-joined by applying a heat and a pressure to the first and second joint portions 204, 206 for a sufficient amount of time to form a unitary portion 212 (step 708, see FIG. 1B). Fusion-joining of the first and second joint portions 204, 206 forms the unitary portion 212 which is a homogenous portion with respect to the first and second components 200, 202. Thus, the unitary portion 212 may have a material structure which is substantially identical to the material structure of one or both of the first and second components 200, 202. Accordingly, through the fusion-joining process, the first and second joint portions 204, 206 are formed into the unitary portion 212 thereby forming the unitary component 214 from the first and second components 200, 202. Subsequent to fusion-joining the first and second joint portions 204, 206, the unitary portion 212 may be cooled to allow the unitary portion 212 to solidify and/or demold (Step 710).

While the methods above are described with respect to the first and second components 200, 202, the present disclosure is not limited to joining or repairing only two components. Accordingly, 3 or more components may be joined at a common joint. A press system, such as the press system 100, may also form more than two interfaces with the components to be joined or repaired.

While various aspects of the present disclosure have been presented, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A method for joining fiber-reinforced thermoplastic composite components, the method comprising:
   providing a first fiber-reinforced thermoplastic composite component and a second fiber-reinforced thermoplastic composite component comprising a first joint portion and a second joint portion, respectively, at least a portion of a surface area of each of the first and second joint portions comprising a respective first and second mating surface;
   positioning the first and second mating surfaces of the respective first and second joint portions in contact with one another;
   consolidating the first and second joint portions with a press system; and
   joining the first and second joint portions by applying heat and pressure to the first and second joint portions with the press system,
   wherein the press system forms a first interface with a first surface of at least one of the first and second joint portions and a second interface with a second surface of at least one of the first and second joint portions opposite the first and second joint portions from the first interface and wherein the first and second surfaces are different than the first and second mating surfaces, and
   wherein joining the first and second joint portions comprises melting an entire volume of the first and second joint portions to form a fused unitary portion of the first and second fiber-reinforced thermoplastic composite components.

2. The method of claim 1, wherein the unitary portion is a homogenous portion.

3. The method of claim 1, wherein the first and second mating surfaces have a load bearing joint configuration.

4. The method of claim 3, wherein the load bearing joint configuration is a step configuration.

5. The method of claim 3, wherein the load bearing joint configuration is a scarf configuration.

6. The method of claim 1, wherein the step of joining the first and second joint portions includes applying a heat and a pressure to the first and second joint portions simultaneously.

7. The method of claim 6, wherein the heat applied to the first and second joint portions is in a range of 600 to 800 T.

8. The method of claim 1, wherein a thickness of the first and second joint portions disposed between the first and second interfaces is greater than 1.5 inches.

9. The method of claim 1, wherein a first material of the first component and a second material of the second component each include at least one ply having a plurality of reinforcing fibers.

10. The method of claim 9, wherein the plurality of reinforcing fibers of the at least one ply in each of the first material and the second material have a unidirectional fiber orientation.

11. The method of claim 1, wherein the first mating surface and the second mating surface each extend from the first surface to the second surface.

12. The method of claim 1, wherein the first component is a skin panel and the second component is a stiffener.

13. The method of claim 1, wherein the press system includes a first tooling portion and a second tooling portion, the first tooling portion forming the first interface with the first surface and the second tooling portion forming the second interface with the second surface and wherein the one or both of the first interface and the second interface are non-planar, the method further comprising:
   tailoring one or both of the first tooling portion and the second tooling portion to a specific geometry of the first component and the second component at the respective first interface and second interface.

14. A method for joining fiber-reinforced thermoplastic composite components, the method comprising:
   providing a first fiber-reinforced thermoplastic composite component and a second fiber-reinforced thermoplastic composite component comprising a first joint portion and a second joint portion, respectively, the first and second joint portions comprising a volume of the respective first and second thermoplastic components and at least a portion of a surface area of each of the first and second joint portions comprising a respective first and second mating surface;
   positioning the first and second mating surfaces of the respective first and second joint portions in contact with one another;
   consolidating the first and second joint portions with a press system; and
   joining the first and second joint portions,
   wherein joining the first and second joint portions comprises melting an entire volume of the first and second joint portions to form a fused unitary portion of the first and second fiber-reinforced thermoplastic composite components which is a homogenous portion.

15. The method of claim 14, wherein the first and second mating surfaces have a load bearing joint configuration.

16. The method of claim 15, wherein the load bearing joint configuration is a step configuration.

17. The method of claim 15, wherein the load bearing joint configuration is a scarf configuration.

18. The method of claim 14, wherein a first material of the first fiber-reinforced thermoplastic composite component and a second material of the second fiber-reinforced thermoplastic composite component each include at least one ply having a plurality of reinforcing fibers.

19. The method of claim 14, wherein the step of joining the first and second joint portions includes applying heat and pressure to the first and second joint portions with the press system, and wherein the heat applied to the first and second joint portions is in a range of 600 to 800° F.

20. The method of claim 14, wherein the press system forms a first interface with a first surface of at least one of the first and second joint portions and a second interface with a second surface of at least one of the first and second joint portions opposite the first and second joint portions from the first interface and wherein the first and second surfaces are different than the first and second mating surfaces; and
   wherein the press system includes a first tooling portion and a second tooling portion, the first tooling portion forming the first interface with the first surface and the second tooling portion forming the second interface with the second surface and wherein the one or both of the first interface and the second interface are non-planar, the method further comprising:
   tailoring one or both of the first tooling portion and the second tooling portion to a specific geometry of the first component and the second component at the respective first interface and second interface.

* * * * *